April 28, 1970        G. BOUWHUIS ET AL        3,509,487

GAS LASER WITH TRANSVERSE MAGNETIC FIELD

Filed Aug. 24, 1966

INVENTORS
GIJSBERTUS BOUWHUIS
HENDRIK DE LANG
BY

*AGENT*

3,509,487
GAS LASER WITH TRANSVERSE MAGNETIC FIELD

Gijsbertus Bouwhuis and Hendrik de Lang, Eindhoven, Netherlands, assignors, by mesne assignments, to U.S. Philips Corporation, New York, N.Y., a corporation of Delaware
Filed Aug. 24, 1966, Ser. No. 574,749
Claims priority, application Netherlands, Sept. 9, 1965, 6511750
Int. Cl. H01s 3/10
U.S. Cl. 331—94.5
3 Claims

ABSTRACT OF THE DISCLOSURE

A gas laser in which a change in the polarization direction of the emitted laser beams is employed for modulation purposes. By inducing into the laser medium an optical anisotropy by the application of a transverse magnetic field, the two resulting stable directions of polarization are at angles of 30° to 100° of each other depending upon the strength of the applied field. The choice between the two stable positions is made by an axial magnetic field pulse of low strength.

---

The invention relates to a device comprising a gas laser in which the discharge path lies in a magnetic field.

Longitudinal magnetic fields in gas lasers are already known for frequency modulation and also for amplitude modulation. At the same time polarization phenomena are also produced in the emitted laser light beams which are strongly dependent, however, not only upon the adjustment of the laser interferometer, i.e., the space optically bounded by the two mirrors of the laser, but also upon numerous other factors. Consequently, the use of the polarization direction as a modulation parameter involves great difficulties.

An object of the invention is to provide a device comprising a laser in which a change in the polarization direction of the emitted laser beam is employed for modulation purposes.

In a device comprising a gas laser in which the discharge path lies in a magnetic field, according to the invention this magnetic field has a strength of from a few to a few tens of oersteds and extends at right angles to the axis of the laser, while under the influence of a modulating, axially-directed magnetic field having a strength of zero or of a few oersteds the sense of polarization of the emitted light has one of two directions being at an angle of approximately 50° to each other.

The invention utilizes the transverse Zeeman effect. The transverse magnetic field and the electromagnetic wave together induce in the laser medium an absorption anistropy which affects the polarization state of the electromagnetic wave. In the stable state, this polarization is linear and the plane of polarization can occupy one of two positions located symmetrically with respect to the transverse field. Each of these two positions of the place of polarization is stable and the position to be occupied in a given case is dependent upon the preceding conditions. A longitudinal magnetic field of the correct sign may cause the plane of polarization to pass from one position to the other which is maintained after the elimination of this longitudinal field. For changing the place of polarization back to the first position, an oppositely directed longitudinal field must be applied for a short time.

Depending upon the strength of the transverse field, the angle between the two stable polarization directions is from 30° to 100°. A large angle has the advantage of greater discrimination possibilities between the two polarization directions and of a low sensitivity to interferences.

The angle of the plane of polarization under the influence of longitudinal magnetic pulses is utilized in the device in accordance with the invention as a modulation parameter in the present invention.

Although the invention can be used in lasers employing a discharge in gases exhibiting the transverse Zeeman effect described hereinbefore, use is preferably made of rare gases, more particularly of mixtures of He and Ne, since the latter are very suitable for this purpose.

Such a modulation method may be used for delta modulation. Although in many cases the maximum useful frequency will not be very high due to the time constants in the gas discharge, this need not involve a great disadvantage, since when lasers are used for communication purposes, the modulation signal comprises only acoustic frequencies in many cases.

This method of modulation using the polarization direction as a parameter affords the advantage that interferences in the light path exert less influence than in case of intensity modulation, while the quantity of modulation energy required is only small and the modulator may be of simple structure.

The invention will now be described more fully with reference to the drawing, in which.

Figure 1:
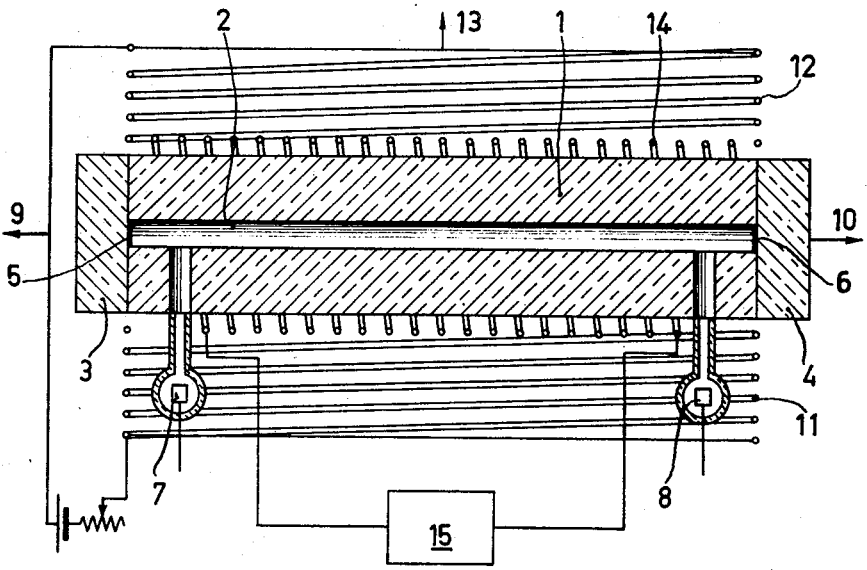
FIG. 1 shows diagrammatically a device in accordance with the invention.

Referring now to FIG. 1, reference numeral 1 denotes a quartz block of 12 cm. length and 3 cm. diameter in which is provided a duct 2 having a diameter of 5 cm. Quartz plates 3 and 4 provided with dichroic mirrors 5 and 6 are formed on its ends. The discharge electrodes 7 and 8 are arranged in lateral tubes. The laser is filled with helium containing 5% of neon. The discharge current has a direct current strength of 5 ma. With a suitable choice of the length of the laser and of the discharge, beams emanate at both ends which have a strength of slightly less than 0.1 mw. at a wave length of $1.15\mu$. The laser is disposed in a system of coils 11 and 12 which produce a magnetic field in the direction of the arrow 13 having a strength of 10 oersteds. The laser is surrounded by a coil 14 which can produce an axially directed field of 2 oersteds when it is fed by the modulator 15. If the dichroic mirrors are used, the wave length $0.63\mu$ also can be employed.

Figure 2:
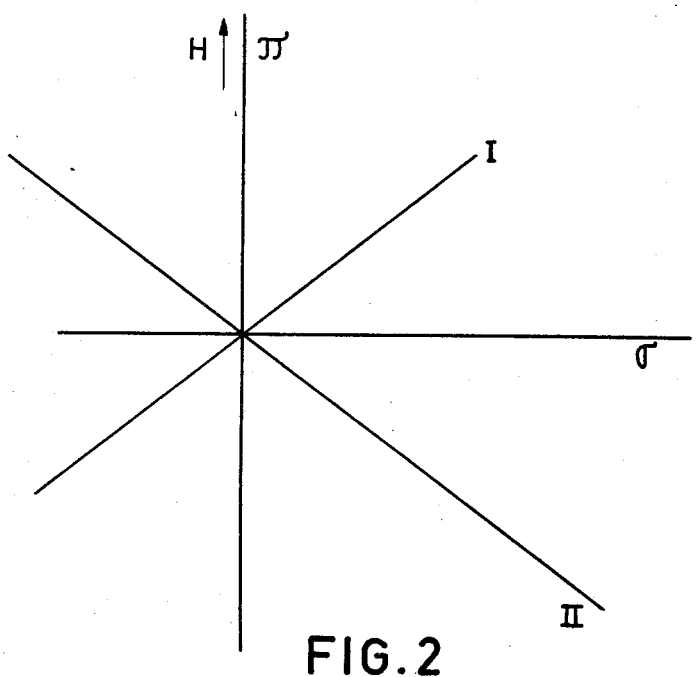
FIG. 2 illustrates a diagram of the directions of polarization.

In FIG. 2, the axes of the co-ordinate system are denoted by $\pi$ and $\sigma$, $\pi$ corresponding with the direction of the transverse magnetic field H indicated with the arrow 13 in FIG. 1. The directions I and II indicate the stable positions of the phase of polarization. In practical cases when longitudinal magnetic pulses are supplied by coil 14, the phase of polarization changes from I and II or reverses, passing over the direction $\sigma$.

What is claimed is:

1. In a device including a laser comprising a hollow member filled with a gas, means to produce an electrical discharge in the gas, and a partially reflective, partially light transmissible wall at one end of said member for transmitting a portion of the radiation produced in said gas externally of said member, said device also including means to produce an axial magnetic field of up to a few oersteds and of varying intensity within said member, and means to simultaneously produce a transverse magnetic field of constant intensity within said member having a strength of a few to a few tens of oersteds whereby the visible radiation is polarized in one of two directions, said directions of polarization being at an angle of approximately 50° to each other.

2. A device as claimed in claim 1, in which the gas discharge is effected in a rare gas.

3. A device as claimed in claim 2, in which the rare gas is a mixture of helium and neon.

References Cited

UNITED STATES PATENTS 3,277,396  10/1966  Statz et al. ---------- 332—16

OTHER REFERENCES

"Gas Lasers in Magnetic Fields" Ahmed et al. Proc. IEEE, 52 pp. 1356–1357, November 1964.

"Microwage Electron Cyclotron Resonance Pumping of a Gas Laser," Ahamed et al., proc. IEEE, 52, pp. 1737–8, December 1964.

"Broadband Magnetic Field Tuning of Optical Masers," Fork et al., app. phys. lett., 2, pp. 180–81, May 1963.

"Quasi-Stationary Polarization of a Single Mode Gas Laser in a Magnetic Field," De Lang et al. phys. lett., 19, (6), December 1965, pp. 481–2.

RONALD L. WIBERT, Primary Examiner

R. J. WEBSTER, Assistant Examiner